A. R. DITSWORTH.
ROOT DIGGING AND GATHERING MACHINE.
APPLICATION FILED OCT. 21, 1912.
1,105,762.
Patented Aug. 4, 1914.
2 SHEETS—SHEET 1.
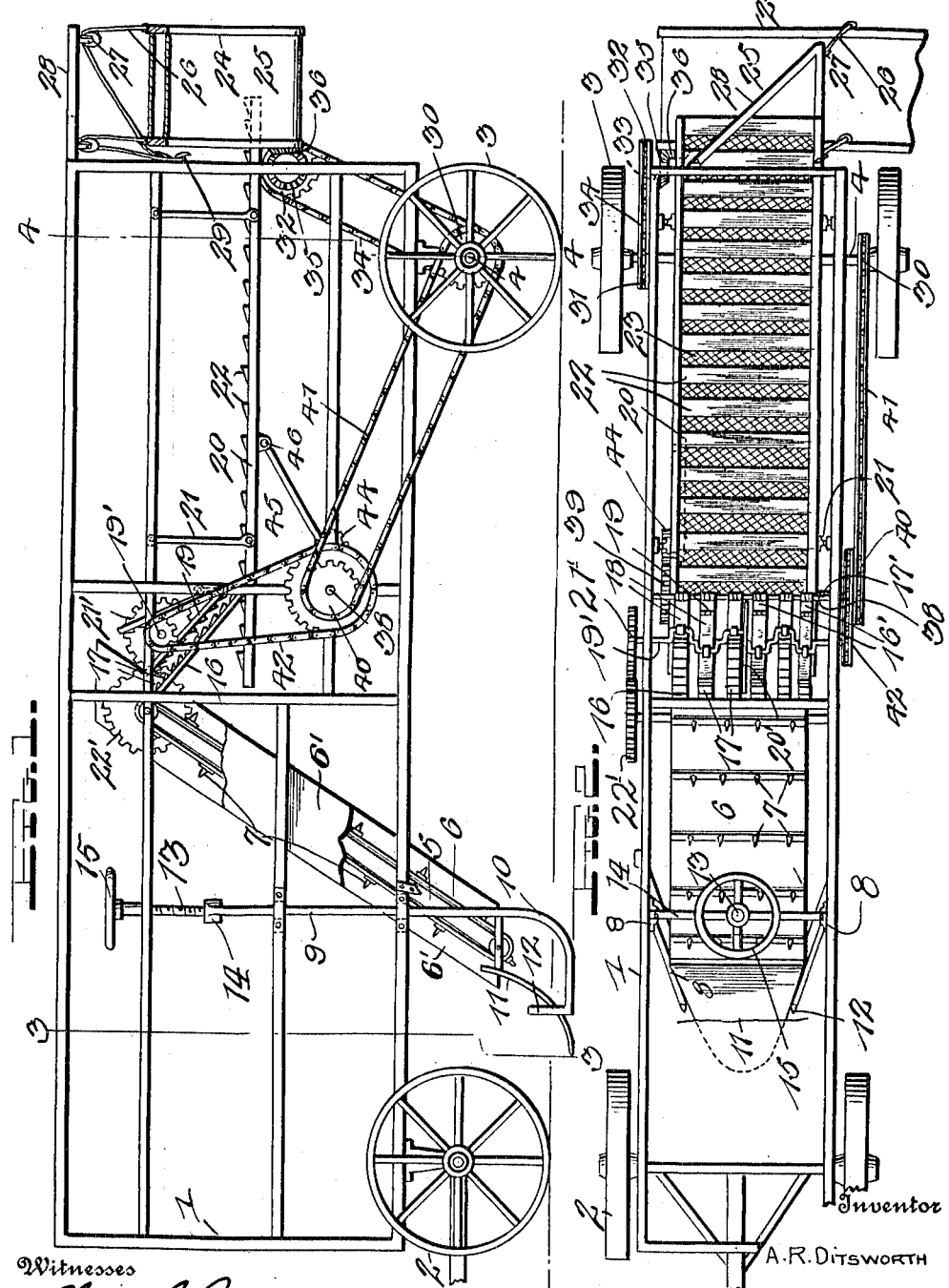
Witnesses
Chas. L. Griesbauer
A. J. Hind
Inventor
A. R. Ditsworth
By Watson E. Coleman
Attorney A. R. DITSWORTH.
ROOT DIGGING AND GATHERING MACHINE.
APPLICATION FILED OCT. 21, 1912.
1,105,762.
Patented Aug. 4, 1914.
2 SHEETS—SHEET 2.
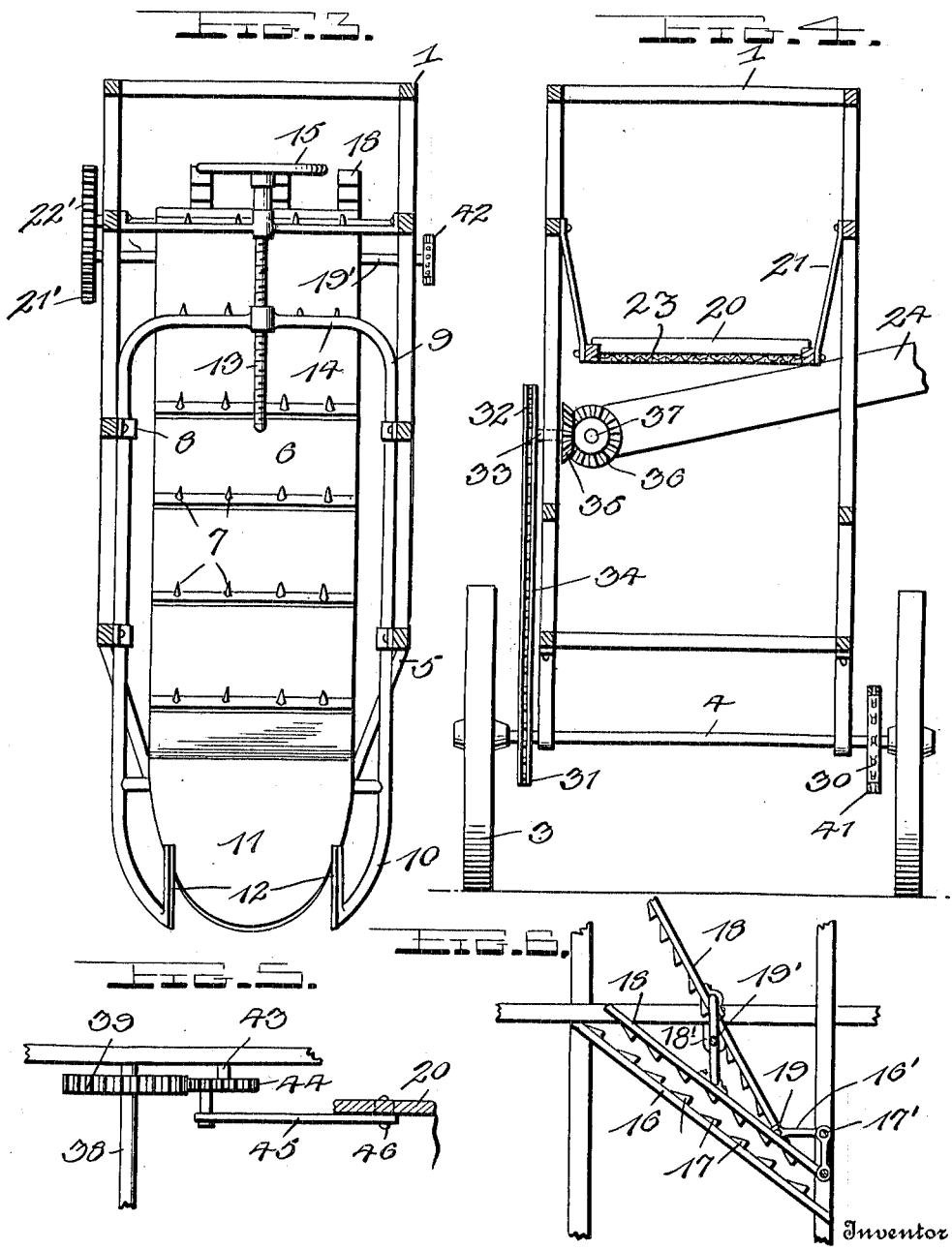
Witnesses
Inventor
A. R. Ditsworth
By Watson E. Coleman,
Attorney

UNITED STATES PATENT OFFICE.

ALFRED R. DITSWORTH, OF LONEROCK, IOWA.

ROOT DIGGING AND GATHERING MACHINE.

1,105,762. Specification of Letters Patent. Patented Aug. 4, 1914.

Application filed October 21, 1912. Serial No. 727,035.

*To all whom it may concern:*

Be it known that I, ALFRED R. DITSWORTH, a citizen of the United States, residing at Lonerock, in the county of Kossuth and State of Iowa, have invented certain new and useful Improvements in Root Digging and Gathering Machines, of which the following is a specification, reference being had to the accompanying drawings.

The present invention pertains to new and useful improvements in a machine for digging earth and separating the same from the roots and vines contained therein and then gathering the roots and vines.

The primary object of the present invention is the production of an efficient operating device of this kind whereby the earth is plowed, then conveyed upon the device to be broken up, then separating the earth from the roots and vines, and discharging the same at the rear of the device into a wagon body or other receptacle.

A machine or apparatus thus shown, is designed especially for mechanically scooping up the earth and separating the same from the roots and vines, and thence depositing the same at the rear of the machine, and the idea is to handle the work mechanically and in bulk rather than a manually operated device, as heretofore, thus making the machine essentially a labor and time saving improvement and doing a given amount of work at a greatly reduced cost as compared with hand labor.

The invention further consists of certain novel details of construction, combination, formation and arrangement of parts as will be hereinafter more fully described and claimed, and particularly pointed out in the appended drawings, in which:—

Figure 1 is a side elevation embodying my invention. Fig. 2 is a plan view of the same. Fig. 3 is a transverse section taken on the line 3—3 of Fig. 1, Fig. 4 is a transverse section on the line 4—4 of Fig. 2, Fig. 5 is a detail horizontal section. Fig. 6 is fragmentary side elevation of the crushing mechanism.

Reference being had to the accompanying drawings, the numeral 1 indicates a suitable framework being supported upon front steering wheels 2 and rear traction wheels 3; the said rear wheels 3 being keyed upon a suitable shaft 4 to which is connected the operating mechanism.

Carried by the forward end of the framework 1 is an inclined frame 5 having mounted thereupon in any preferred manner an endless belt 6, this belt 6 having arranged thereupon prongs or similar projections 7 so that when the earth or roots are deposited upon the conveyer, the same will be raised upwardly and rearwardly, as will be hereinafter described. The frame 5 is provided with a pair of side members 6' which prevent the soil from falling off the sides of the conveyer as the same is conveyed from the plow to the breakers.

Slidably mounted within bearings 8, carried by the framework 1, is a yoke member 9 being curved at its lower extremity, as at 10, and having permanently secured thereto a plow blade or scoop 11. Extending upon opposite sides of the plow blade are vertically extending blades 12 which obviously permits the scoop to penetrate the ground and raise the earth, whereas the side blades 12 cut the earth to the width of the plow blade. A vertically extending shaft 13 is suitably journaled upon the medial portion of the frame 1 and extends through the transverse portion 14 of the upper end of the yoke member 9. This shaft 13 is threaded and has keyed upon its upper end a hand wheel 15 so that when the hand wheel 15 is rotated, the yoke 9 will apparently be raised or lowered, which in turn will also raise and lower the plow blade 11. This obviously provides means for holding the plow blade out of engagement with the ground and also provides means for holding the plow blade at the desired depth within the ground.

Extending diagonally of the frame are a plurality of longitudinally arranged bars 16 each of which has formed upon the upper face thereof a plurality of angular teeth 17. The upper ends of these bars are arranged adjacent the rear end of the conveyer 6 whereby the sod may be deposited thereupon and then dropped by gravity upon a separator 20. When the sods are upon the bar 16 I provide means for crushing the same before depositing them upon the separator 20. This means comprises a plurality of arms 18 hingedly secured at one end as at 19 to links 16' which are hingedly connected to a transverse bar 17' carried by the main frame 1. These arms 18 operate intermediate the bars 16 and above the same and are also provided on their lower face with angular teeth which are adapted to engage the soil. To provide means for reciprocating each of these arms I journal within suitable bearings 18' secured upon the frame 1 as shown a crank shaft 19'. These arms 18 are connected to the cranks of the said shaft whereby upon the rotation of the said shaft a reciprocal movement will be transmitted to the arms 18 which will obviously crush the dirt before depositing the same upon the separator. A partition 20' is interposed between the bars 16 for dividing the dirt as the conveyer deposits the same upon the bars 16. This separator 20 comprises an elongated frame which is pivotally supported to the main frame 1 by means of depending links 21.

Extending transversely upon the upper face of the frame of the separator is a plurality of feed bars 22 being preferably triangular in cross section so that when the roots are deposited thereupon, the same will be gradually conveyed to the rear end of the separator as the same is reciprocated. The frame work of the separator is also provided with a wire screen 23 which supports the roots between each of the transversely extending beaters and at the same time allows the dirt to sift therethrough.

Extending transversely of the main frame 1 and pivotally secured at one end thereto is a frame 24 having mounted thereupon an endless conveyer 25. The other end of this frame 24 is supported by cables 26 which extend over pulleys 27 carried by an auxiliary frame 28 mounted at the rear end of the main frame 1. The opposite ends of the cables 26 are fixed in any well known manner, as shown at 29, upon the main frame 1 so that the frame 24 may be raised and lowered and held at the desired height.

It will be noted from the foregoing that the plow blade 11 penetrates the ground and the earth and roots will then be deposited upon the conveyer 6, which are then carried to the breaking mechanism as before described which breaks the same up into particles and thence deposits the same upon the separator frame 20. This separator frame separates the earth from the roots and allows the earth to drop therethrough and upon the reciprocation thereof causes the roots to be carried to the rear end of the frame which are then deposited within the conveyer 25 which subsequently conveys the roots into a wagon body or other suitable receptacle.

For operating the various parts of the machine, as before described, I provide a mechanism which is as follows: Keyed upon the rear shaft 4 of the device is a pair of sprocket wheels 30 and 31. The sprocket wheel 31 is connected to a sprocket wheel 32 carried by a transversely extending shaft 33 journaled within the main frame 1 by means of a sprocket chain 34. The opposite end of the shaft 33 is provided with a bevel gear 35 which meshes with a similar gear 36 carried by the longitudinally extending shaft 37 of the endless conveyer 25. This aforesaid mechanism apparently provides means whereby upon the rotation of the shaft 4, as the device travels over the fields, the endless conveyer 25 will be operated.

Extending transversely of the main frame and journaled thereto is a shaft 38 having a gear 39 keyed to one end thereof and a double sprocket wheel 40 keyed to the opposite end thereof. This double sprocket wheel is connected to the sprocket wheel 30 carried by the shaft 4 by means of the sprocket chain 41 and also the larger sprocket thereof is operatively connected to the crank shaft 19' by means of sprocket chain 42. The opposite end of the shaft to that to which the sprocket chain 42 is connected is provided with a gear wheel 21' being in mesh with the gear wheel 22' carried by the upper transverse shaft of the endless conveyer 6 thereby providing means whereby upon the rotation of the crank shaft 19' the endless conveyer 6 will also be operated. A shaft 43 is also suitably mounted upon the main frame 1 and carries therewith a pinion 44 which meshes with the gear 39 and which has eccentrically mounted thereupon one end of a link 45, the opposite end of said link being pivotally connected, as at 46, to the separator frame 20. From the aforesaid construction it is obvious that upon the rotation of the shaft 4 a rotary movement will also be imparted to the shaft 38 which in turn will also rotate the drum 18 and reciprocate the separator frame 20 and the gear as described.

Whereas from the foregoing I have described my invention in its simple and preferred construction, it is, of course, to be understood that other minor details as to changes of form, modification, and alteration may be resorted to that come within the scope thereof without departing from the spirit or sacrificing the efficiency of the same.

It is also to be particularly noted that a device of this character may be comparatively inexpensive of cost to manufacture, strong and durable and reliable when in use, thereby rendering the same commercially desirable.

What I claim is:

In combination with a movably supported separating device and a conveyer terminating thereabove, a plurality of spaced downwardly inclined toothed arms, a plurality of similarly inclined arms supported so as to oscillate immediately above the first mentioned toothed arms, cranks operatively connected with the latter and intermediate their respective lengths, links operatively connected with the lower ends of said arms, and means operatively connected with the conveyer to operate the crank shaft.

In testimony whereof I hereunto affix my signature in the presence of two witnesses.

ALFRED R. DITSWORTH.

Witnesses:
CHAS. KELSAR,
ELMER A. MYHRE.

Copies of this patent may be obtained for five cents each, by addressing the "Commissioner of Patents, Washington, D. C."